US012782043B2

(12) United States Patent
Laville et al.

(10) Patent No.: US 12,782,043 B2
(45) Date of Patent: Nov. 3, 2026

(54) MEDICAL CONTACT SHOCK FREEZER

(71) Applicant: B MEDICAL SYSTEMS S.à̀r.l., Hosingen (LU)

(72) Inventors: Kevin Laville, Wahlhausen (LU); Imane Hajji, Ettelbruck (LU); Uwe Schramer, Irrel (DE)

(73) Assignee: B MEDICAL SYSTEMS S.À.R.L., Hosingen (LU)

(*) Notice: Subject to any disclaimer, the term of this patent is extended or adjusted under 35 U.S.C. 154(b) by 91 days.

(21) Appl. No.: 18/579,453

(22) PCT Filed: Jul. 15, 2022

(86) PCT No.: PCT/EP2022/069852
§ 371 (c)(1),
(2) Date: Jan. 15, 2024

(87) PCT Pub. No.: WO2023/285652
PCT Pub. Date: Jan. 19, 2023

(65) Prior Publication Data

US 2024/0328680 A1 Oct. 3, 2024

(30) Foreign Application Priority Data

Jul. 16, 2021 (GB) .................................. 2110256.1

(51) Int. Cl.
*F25D 31/00* (2006.01)
*A01N 1/144* (2025.01)
(Continued)

(52) U.S. Cl.
CPC ........... *F25D 31/001* (2013.01); *A01N 1/144* (2025.01); *F25B 5/02* (2013.01); *F25B 7/00* (2013.01);
(Continued)

(58) Field of Classification Search
CPC ...... F25B 7/00; F25B 47/025; F25B 2400/05; F25B 2400/051; F25B 2400/054; A01N 1/144; F25D 31/001; F25D 11/04
See application file for complete search history.

(56) References Cited

U.S. PATENT DOCUMENTS

| | | | | |
|---|---|---|---|---|
| 1,905,131 A * | 4/1933 | Birdseye | A23B 2/8055 62/331 |
| 3,392,541 A * | 7/1968 | Nussbaum | F25B 13/00 62/324.3 |

(Continued)

FOREIGN PATENT DOCUMENTS

| | | |
|---|---|---|
| CN | 112195015 | 1/2021 |
| FR | 2632391 | 12/1989 |

(Continued)

OTHER PUBLICATIONS

Machine translation of FR2632391 (Year: 1988).*
(Continued)

*Primary Examiner* — Christopher R Zerphey
(74) *Attorney, Agent, or Firm* — Jerold I Schneider; SCHNEIDER IP LAW

(57) ABSTRACT

A medical contact shock freezer (10) adapted for fast freezing a plurality of individual bags containing a medical liquid, notably blood plasma, the medical contact shock freezer comprising: —a first pair of freezing plates (11), at least one of the freezing plates of the first pair of freezing plates being moveable between i) a loading position of the freezing plates in which sufficient separation is provided between the freezing plates to load or unload the individual bags between the freezing plates and ii) a freezing position in which the individual bags arranged between the freezing plates are clamped between the freezing plates; and—a first refrigeration circuit (15) configured when in a refrigeration mode to remove heat from the first pair of freezing plates to
(Continued)

freeze the individual bags clamped between the first pair of freezing plates; in which—the first refrigeration circuit comprises a cascade refrigeration circuit comprising a first stage refrigeration circuit (S1), a second stage refrigeration circuit (S2) and an inter-stage heat exchanger (17).

14 Claims, 5 Drawing Sheets

(51) Int. Cl.

| | |
|---|---|
| ***F25B 5/02*** | (2006.01) |
| ***F25B 7/00*** | (2006.01) |
| ***F25B 40/04*** | (2006.01) |
| ***F25B 41/37*** | (2021.01) |
| ***F25B 41/42*** | (2021.01) |
| ***F25B 47/02*** | (2006.01) |
| ***F25B 49/02*** | (2006.01) |
| ***F25D 21/04*** | (2006.01) |

(52) U.S. Cl.

CPC .............. *F25B 41/37* (2021.01); *F25B 41/42* (2021.01); *F25B 47/025* (2013.01); *F25B 49/02* (2013.01); *F25B 40/04* (2013.01); *F25B 2313/02742* (2013.01); *F25B 2400/054* (2013.01); *F25B 2400/07* (2013.01); *F25B 2400/12* (2013.01); *F25B 2500/09* (2013.01); *F25B 2600/111* (2013.01); *F25D 21/04* (2013.01)

(56) References Cited

U.S. PATENT DOCUMENTS

| | | | | |
|---|---|---|---|---|
| 4,907,421 | A * | 3/1990 | Battistella | F25D 31/001 100/324 |
| 6,393,853 | B1 * | 5/2002 | Vukovic | H01L 23/473 257/E23.098 |
| 6,393,860 | B1 * | 5/2002 | Heschel | F25D 3/10 62/376 |
| 6,698,213 | B2 * | 3/2004 | Voute | A61M 1/0272 62/356 |
| 8,011,201 | B2 | 9/2011 | Brown | |
| 9,593,869 | B2 * | 3/2017 | Asari | F25B 1/00 |
| 11,612,679 | B2 * | 3/2023 | Fischbach | A61M 1/0272 62/66 |
| 11,679,183 | B2 | 6/2023 | Fischbach | |
| 12,320,568 | B2 * | 6/2025 | Yamaguchi | F25B 40/00 |
| 12,410,960 | B2 * | 9/2025 | Heskett | F25D 31/001 |
| 2008/0223074 | A1 | 9/2008 | Pachai | |
| 2016/0178246 | A1 * | 6/2016 | Toyooka | F25B 9/008 62/502 |
| 2018/0146799 | A1 | 5/2018 | Resch | |
| 2018/0146800 | A1 | 5/2018 | Resch | |

FOREIGN PATENT DOCUMENTS

| | | |
|---|---|---|
| JP | 2014070832 | 4/2014 |
| WO | WO2008112566 | 9/2008 |
| WO | WO2015/045354 | 4/2015 |
| WO | WO2015/0485354 | 4/2015 |

OTHER PUBLICATIONS

Plasma Contact Shock Freezer CSF61—publication date unknown—published prior to applicant's priority date.

Cryo Life Science Technologies GmbH—KLF—publication date unknown—published prior to applicant's priority date.

Swep B10T Product Sheet—publication date unknown—published prior to applicant's priority date.

ISR for PCT/EP2022/069852 (Dec. 15, 2022).

ISA Written Opinion for PCT/EP2022/069852 (with applicant's comments to IPEA.

* cited by examiner

MEDICAL CONTACT SHOCK FREEZER

CROSS-REFERENCE TO RELATED APPLICATIONS

This application is the U.S National Stage Entry of PCT Application No. PCT/EP2022/069852 filed 15 Jul. 2022, which claims priority to Great Britain Application No. GB2110256.1 filed on 16 Jul. 2021, the entireties of both of which are hereby incorporated by reference.

This invention relates to a medical contact shock freezer adapted for fast freezing a plurality of individual bags containing a medical liquid, for example blood plasma, a biological preparation or a pharmaceutical preparation, and to a method of freezing medical liquids.

Blood plasma bags are commonly used to store, transport and dispense blood plasma and comprise flexible plastics walls which may be made of polyethylene, polypropylene or plasticized PVC. In order to ensure plasma quality, once the plasma has been obtained, for example by plasmapheresis, it is desirable for the plasma contained within a filled, sealed plasma bag to be completely frozen to a temperature of −30° C. or less within a short time period. The step of rapidly freezing the plasma, for example from its collection temperature or from room temperature to −30° C., is facilitated by use of a contact shock freezer in which a plurality of plasma bags are pressed between cooling plates which are chilled by a circulating coolant. Once frozen, the plasma bags are transferred to a medical storage freezer which may be maintained at a temperature of −30° C., −50° C. or below.

Contact shock freezers require a high refrigeration power in order to rapidly remove a significant quantity of heat from the sealed plasma bags. For example, a cooling power of over 1.5 KW is required to reduce the temperature of forty-eight 0.25 l bags of plasma from 32° C. to −30° C. in less than 60 minutes. Consequently, contact shock freezers have typically been based on refrigeration circuits which use large, high power semi-hermetic compressors and large quantities of refrigerant. The power requirements for the medical storage freezers to which the shock frozen plasma bags are transferred is significantly lower and the cooling circuits for such medical storage freezers are thus designed accordingly.

In accordance with one of its aspects, the present invention provides a medical contact shock freezer in accordance with claim 1, notably a medical contact shock freezer adapted for fast freezing a plurality of individual bags containing a medical liquid, particularly blood plasma, the medical contact shock freezer comprising:

- a first pair of freezing plates, at least one of the freezing plates of the first pair of freezing plates being moveable between i) a loading position of the freezing plates in which sufficient separation is provided between the freezing plates to load or unload the individual bags between the freezing plates and ii) a freezing position in which the individual bags arranged between the freezing plates are clamped between the freezing plates; and
- a first refrigeration circuit configured when in a refrigeration mode to remove heat from the first pair of freezing plates to freeze the individual bags arranged between the first pair of freezing plates;

in which

- the first refrigeration circuit comprises a cascade refrigeration circuit comprising a first stage refrigeration circuit, a second stage refrigeration circuit and an inter-stage heat exchanger;

- the first stage refrigeration circuit being configured when in a refrigeration mode to circulate a first stage refrigerant, preferably a hydrocarbon refrigerant, notably R290 (propane), sequentially through a first stage compressor, a first stage condenser, a first stage expansion device, notably a first stage capillary, the inter-stage heat exchanger and back to the first stage compressor so as to remove heat from the inter-stage heat exchanger and release heat to the environment via the first stage condenser; and
- the second stage refrigeration circuit being configured when in a refrigeration mode to circulate a second stage refrigerant, preferably a hydrocarbon refrigerant, notably R170 (ethane) sequentially through a second stage compressor, preferably a second stage desuperheater, the inter-stage heat exchanger, a second stage expansion device, notably a second stage capillary, the first pair of freezing plates and back to the second compressor so as to remove heat from the first pair of freezing plates of the contact shock freezer and release heat to the inter-stage heat exchanger.

The dependent claims define preferred or alternative features.

In one of its aspects, the present invention is based upon the realisation that the combination of a cascade refrigeration system, particularly using fully hermetic compressors, can be adapted to provide a suitable cooling system for such a contact shock freezer. It is particularly surprising that such a contact shock freezer system can also use environmentally friendly green refrigerant gasses which are generally less efficient that the refrigerants traditionally used in high power contact shock freezer refrigeration circuits. Thus, the present invention provides, in one of its aspects, a surprising way of providing a contact shock freezer which uses environmentally friendly green refrigerant gasses, notably hydrocarbon refrigerants gasses (and thus avoids the need to use refrigerant gasses in a contact shock freezer whose use is less desirable or outlawed, for example CFCs (ChloroFluoroCarbons), HCFCs (HydroChloroFluoroCarbons) and HFCs) by the use of a cascade refrigeration system for its contact shock freezer.

As used herein, the term contact shock freezer means a freezer which is configured to clamp the individual bags containing a medical liquid between the freezing plates during the freezing process such that the surfaces of the bags in contact with the freezing plates are flattened; this increases the contact area and improves heat transfer. Sufficient force may be applied to clamp the bags between the freezing plates such that a pressure which is ≥0.1 bar or ≥0.2 bar and/or ≤0.5 bar is generated in the medical liquid within the bags.

Each bag to be frozen may contain a quantity of medical liquid, notably blood plasma, which is ≥150 ml, ≥200 ml or ≥250 ml and/or ≤1000 ml, ≤850 ml, ≤500 ml or ≤450 ml or ≤350 ml. Each bag may have a nominal volume of 500 ml; in this case, each bag may contain about 250 ml of medical liquid, notably plasma, for example from a whole blood donation of 500 ml. Each bag may have a nominal volume of 1000 ml; in this case, each bag may contain about 850 ml of medical liquid, notably plasma, for example from plasmapheresis.

Each pair of freezing plates is preferably substantially horizontal; this facilitates loading and unloading of the individual bags, for example by arranging the individual bags of medical liquid to be frozen on a heat conductive tray and loading the tray carrying the individual bags between the freezing plates when in their loading position. Thus, to facilitate loading and unloading, the freezing plates are preferably arranged at an angle of less to 30° to the horizontal. An improvement in the freezing cycle can be obtained by arranging the freezing plates at a small angle to the horizontal, for example at an angle of at least 2° or at least 3° with respect to the horizontal; this helps to mitigate against unintentional inclusion of air in the bags. An angle of between 3° and 10°, notably 5°, to the horizontal provides an advantageous effect combined with a configuration which facilitates loading and unloading of the bags.

The or each pair of freezing plates may define an operating surface, that is to say a surface at which individual bags can be arranged for freezing, which has an area ≥0.25 $m^2$, ≥0.3 $m^2$, ≥0.4 $m^2$, ≥0.5 $m^2$, ≥0.55 $m^2$, ≥0.7 $m^2$ or ≥0.8 $m^2$ and/or ≤1.4 $m^2$, ≤1.3 $m^2$≤1.2 $m^2$ or ≤1 $m^2$. For example, the or each pair of freezing plates may define an operating surface which has:

- a width that is ≥0.4 m, ≥0.5, ≥0.6 m, ≥0.7 m, ≥0.8 m or ≥0.9 m and/or ≤1.6 m, ≤1.5 m, ≤1.2 m or less than 1.1 m; and/or
- a depth that is ≥0.5 m, ≥0.6 m and/or ≤1.1 m, ≤1 m or ≤0.9 m.

Such dimensions facilitate loading of the bags by an operator. The or each pair of freezing plates may be configured and/or dimensioned to simultaneously freeze ≥9 bags, ≥12 bags, ≥16 bags, ≥21 bags or ≥30 bags and/or ≤50, ≤48, ≤40 or ≤32 bags, notably 500 ml nominal volume bags. For example, the or each pair of freezing plates may be configured and/or dimensioned to simultaneously freeze 3, 4, 5, 6, 7 8 or 9 rows of bags arranged across its width with 3 or 4 bags in each row arranged along its depth, notably bags having a nominal volume of 500 ml. Particularly in the case of bags containing between 150 ml and 355 ml of medical liquid to be frozen, individual bags may be stacked one on another to form i) a first layer of bags, each bag in the first layer having a lower side which is in contact with the contact surface of a lower freezing plate of a pair of freezing plates and ii) a second layer of bags, each bag in the second layer having a lower side which sits on an upper side of a bag in the first layer of bags and an upper side which, in the freezing position, is in contact with the contact surface of an upper freezing plate of the pair of freezing plates. Preferably, each bag has an outlet from which the medical liquid will be extracted, and the outlet is arranged facing the rear of the shock freezer.

Each of the first and second stage refrigerants is preferably a non-CFC, non-HCFC, refrigerant. The use of CFCs (chlorofluorocarbons) and HCFCs (hydrochlorofluorocarbons) is undesirable, and in some cases banned, due to their greenhouse gas effect. One or more of the first and second stage refrigerants may be a HFC (hydrofluorocarbon). Nevertheless, refrigerants having even less environmental impact than HFCs are preferred so that each of the first and second stage refrigerants is more preferably a non-CFC, non-HCFC, non-HFC refrigerant, preferably a hydrocarbon refrigerant.

The first stage refrigerant is preferably selected from: R290 (propane); a mixed refrigerant comprising at least 80 wt % R290 (propane); a mixed refrigerant comprising at least 80 wt % R290 (propane) and at least 5 wt % R600a (isobutane), for example a mixed refrigerant comprising about 80 wt % R290 (propane) and about 10 wt % R600a (isobutane); a mixed refrigerant comprising at least 80 wt % R290 (propane) and at least 5 wt % R170 (Ethane), for example a mixed refrigerant comprising about 90 wt % R290 (propane) and about 10 wt % R170 (Ethane); R1270 (propylene); a mixed refrigerant comprising at least 80 wt % R1270 (propylene); a mixed refrigerant comprising at least 80 wt % R1270 (propylene) and at least 5 wt % R600a (isobutane), for example a mixed refrigerant comprising about 90 wt % R1270 (propylene) and about 10 wt % R600a (isobutane); a mixed refrigerant comprising at least 80 wt % R1270 (propylene) and at least 5 wt % R170 (ethane), for example a mixed refrigerant comprising about 90 wt % R1270 (propylene) and about 10 wt % R170 (ethane). The use of R290 (propane) as the first stage refrigerant is particularly preferred notably for its refrigerant properties combined with its availability which particularly facilitates replacement of the first stage refrigerant if this becomes necessary.

The second stage refrigerant is preferably selected from: R170 (ethane); a mixed refrigerant comprising at least 85 wt % R170 (ethane); a mixed refrigerant comprising at least 85 wt % R170 (ethane) and at least 2 wt % R290 (propane), for example a mixed refrigerant comprising about 95 wt % R170 (ethane) and about 5 wt % R290 (propane); a mixed refrigerant comprising at least 85 wt % R170 (ethane) and at least 1 wt % R601 (pentane), for example a mixed refrigerant comprising about 97 wt % R170 (ethane) and about 3 wt % R601 (pentane); R1150 (ethylene); a mixed refrigerant comprising at least 85 wt % R1150 (ethylene); a mixed refrigerant comprising at least 85 wt % R1150 (ethylene) and at least 2 wt % R290 (propane), for example a mixed refrigerant comprising about 95 wt % R1150 (ethylene) and about 5 wt % R290 (propane); a mixed refrigerant comprising at least 85 wt % R1150 (ethylene) and at least 1 wt % R601 (pentane), for example a mixed refrigerant comprising about 97 wt % R1150 (ethylene) and about 3 wt % R601 (pentane). The second stage refrigerant may include a small quantity, notably between 1 wt % and 5 wt %, of R601 (pentane); this facilitates the second stage oil return.

The use of R170 (ethane) as the second stage refrigerant is particularly preferred notably for its refrigerant properties combined with its availability which particularly facilitates replacement of the first stage refrigerant if this becomes necessary.

Preferably, the first stage refrigerant is selected from the aforementioned first stage refrigerants and the second stage refrigerant is selected from the aforementioned second stage refrigerants.

As used herein, reference to a refrigerant by its "R" number, for example R290 (propane) and R170 (ethane), means "refrigerant grades" of the materials i.e., grades (which are generally less than 100% pure) which are intended for and used for refrigeration applications. For example, each of R290 (propane) and R170 (ethane) preferably and generally has a purity of at least 97.5%.

Although the preferred non-CFC, non-HCFC, non-HFC hydrocarbon refrigerants are flammable, the present invention allows the contact shock freezer to be configured using quantities of these refrigerants that are sufficiently small to mitigate any associated risk. Notably, the first stage refrigeration circuit preferably comprises less than 400, more preferably less than 300 g and even more preferably less than 200 g of the first stage refrigerant; and/or the second stage refrigeration circuit preferably comprises less than 400 g, more preferably less than 300 g and even more preferably less than 200 g of the second refrigerant. A contact shock freezer in which the first stage refrigerant is about 150 g of R290 (propane) and the second stage refrigerant is about 150 g of R170 (ethane) has been shown to be effective in allowing the freezing of 30 individual bags of 250 ml of blood plasma from 32° C. to −30° C. in under 40 minutes. Thus, according to another aspect, part of the present invention is based upon the realisation that an effective contact shock freezer can be configured using such refrigerants in advantageously small quantities.

The freezing plates may be configured to operate at a temperature which is ≤−40° C., ≤−45° C., ≤−50° C. or ≤−55° C. This provides rapid shock freezing. This operating temperature is preferably reached with 30 minutes, within 25 minutes or within 20 minutes of initial operation of the shock freezer. The freeze time required to attain a core temperature of the medical liquid in the bags of −30° C. is preferably ≤60 minutes, ≤50 minutes or more preferably ≤45 minutes, notably when the freezing plates are fully loaded with bags to be frozen at an initial temperature of 20° C., notably bags each containing ≥200 ml or ≥250 ml and/or ≤1000 ml or ≤850 ml of blood plasma. Preferably, such a freezing performance is achieved with an initial temperature which is ≥25° C., ≥30° C. or ≥32° C. and/or ≤35° C. Preferably, each freezing plate is configured to operate at a temperature of about −60° C., notably within the range −55° C. to −65° C., preferably within the range −58° C. to −62° C.; this provides good efficiency and heat transfer.

The movement of the freezing plate(s) from the loading position to the freezing position is preferably a linear movement, notably a vertical linear movement, without rotation of either freezing plate. This facilitates accurate clamping of the plurality of bags between the plates. Preferably, the freezing plates are parallel in their freezing position and remain parallel during movement between the loading and the freezing position. This further facilitates accurate clamping of the plurality of bags. The use of parallel and preferably planer freezing plates is also advantageous when it is desired for the shock freezer to be useable in a configuration having two layers of bags arranged between a pair of freezing plates. Preferably, the angle of each freezing plate to the horizontal is fixed, that is to say this angle does not change; each freezing plate may be fixed in rotation so that it cannot rotate. At least one of the upper and lower freezing plates of a pair of freezing plates may be associated with a linear drive to affect its movement from the loading to the freezing position, for example one or more pneumatic or hydraulic cylinders, notably a pair of spaced cylinders, for example arranged at opposite sides of the freezing plate. The movement may be guided by a linear guide arrangement, for example comprising a linear guide arranged at each of the left and right sides of the freezing plate. Each linear guide may comprise a pair of, preferably vertical, tubular guide elements which together guide the movement.

The first pair of freezing plates may comprise an upper freezing plate and a lower freezing plate, with the upper freezing plate being arranged above the lower freezing plate. This provides a convenient arrangement, notably where each of the upper and lower freezing plates is horizontal or substantially horizontal, for example arranged at an angle of less than 30° to the horizontal.

The contact shock freezer may comprise a single pair of freezing plates. Alternately, the contact shock freezer may comprise two (and only two) pairs of freezing plates.

Preferably, one of the freezing plates of a pair of freezing plates is immobile and does not move during normal operation of the contact shock freezer with the other freezing plate of the pair being a moveable freezing plate; this provides a mechanically advantageous arrangement.

An arrangement in which the shock freezer comprises:

a first pair of upper and lower freezing plates and a second pair of upper and lower freezing plates, the first pair being arranged above the second pair;

in which the first pair of upper and lower freezing plates comprises an immobile lower freezing plate and a moveable upper freezing plate; and in which the second pair of upper and lower freezing plates comprises an immobile upper freezing plate and a moveable lower freezing plate;

and notably in which the lower freezing plate of the first pair of freezing plates and the upper freezing plate of the second pair of freezing plates are provided by a single, integrated freezing plate, provides a compact and convenient arrangement for providing two pairs of freezing plates to enable simultaneous freezing of a large number of individual bags whilst minimising the footprint of the shock freezer and facilitating loading and unloading.

Thus, in one preferred arrangement, the contact shock freezer comprises two (and only two) pairs of freezing plates, comprising the first pair of freezing plates which comprises an upper freezing plate and a lower freezing plate, and a second pair of freezing plates, arranged as an upper freezing plate and a lower freezing plate, at least one of the freezing plates of the second pair of freezing plates being moveable between i) a loading position of the freezing plates in which sufficient separation is provided between the freezing plates to load or unload the individual bags between the freezing plates and ii) a freezing position in which the individual bags arranged between the freezing plates are clamped between the freezing plates;

and the contact shock freezer further comprises:

a second refrigeration circuit configured to remove heat from the second pair of freezing plates to freeze the individual bags clamped between the second pair of freezing plates;

in which the second refrigeration circuit comprises a cascade refrigeration circuit comprising a first stage refrigeration circuit, a second stage refrigeration circuit and an inter-stage heat exchanger;

the first stage refrigeration circuit being configured when in a refrigeration mode to circulate a first stage refrigerant, preferably a hydrocarbon refrigerant, notably R290 (propane), sequentially through a first stage compressor, a first stage condenser, a first stage capillary, the inter-stage heat exchanger and back to the first stage compressor so as to remove heat from the inter-stage heat exchanger and release heat to the environment via the first stage condenser; and the second stage refrigeration circuit being configured when in a refrigeration mode to circulate a second stage refrigerant, preferably a hydrocarbon refrigerant, notably R170 (ethane), sequentially through a second stage compressor, preferably a second stage desuperheater, the inter-stage heat exchanger, a second stage capillary, the second pair of freezing plates and back to the second compressor so as to remove heat from the second pair of freezing plates of the contact shock freezer and release heat to the inter-stage heat exchanger.

The first and second pair of freezing plates are preferably arranged with one pair above the other. In a particularly preferred arrangement, the lower freezing plate of the first pair of freezing plates and the upper freezing plate of the second pair of freezing plates are provided by a single, integrated and preferably immobile freezing plate.

Preferably, the first refrigeration circuit and the second refrigeration circuit are independently operable, that is to say, for example that one can be operated without the other. This enables each pair of the two pairs of freezing plates to be operated independently, for example in the event of the capacity of one pair of freezing plates being sufficient for the number of bags it is desired to freeze simultaneously.

Where independently operable first and second refrigeration circuit are provided, the components and configuration of each refrigeration circuit are preferably identical or substantially identical; this facilitates assembly and maintenance. Thus, the disclosure herein in relation to the components, configuration and arrangement of one of the refrigeration circuits applies equally to the equivalent components, configuration and arrangement of the other refrigeration circuit.

Preferably, the first stage compressor and the second stage compressor are fully hermetic compressors, notably having a power of less than 3 hp, preferably less than 2.5 hp, more preferably less than 2 hp. The use of fully hermetic compressors allows the selection of appropriate compressors which are smaller, simpler, more efficient and/or easier to replace than other types of compressors. This may be used, in addition, to reduce the operating noise of the medical contact shock freezer.

The inter-stage heat exchanger is preferably thermally insulated to reduce heat influx from the surrounding environment. For example, the inter-stage heat exchanger may be enclosed within an insulated enclosure. Use of a multiple plate heat exchanger provides a robust arrangement which is suitable for the desired working temperatures. A multiple plate heat exchanger comprises a series of adjacently arranged, spaced parallel plates with the space between adjacent plates forming channels; the first stage and second stage refrigerants of the cascade refrigeration circuit flow through adjacent channels between the plates such that heat exchange occurs between the first stage and second stage refrigerants through the plates. An arrangement in which the first stage and second stage refrigerants cross the channels in series may be appropriate for the associated flow rate and heat exchange.

In accordance with another aspect, the present invention provides a method of fast freezing a plurality of individual bags containing a medical liquid, particularly blood plasma, the method comprising:

a) providing a medical contact shock freezer as disclosed herein, notably as claimed herein;

b) clamping the plurality of individual bags containing a medical liquid between the first pair of freezing plates; and;

c) operating the first refrigeration circuit in its refrigeration mode to remove heat from the first pair of freezing plates to freeze the individual bags arranged between the first pair of freezing plates.

In accordance with a further aspect, the present invention provides for use of a first refrigeration circuit comprising a cascade refrigeration circuit comprising a first stage refrigeration circuit, a second stage refrigeration circuit and an inter-stage heat exchanger for fast freezing a plurality of individual bags containing a medical liquid, particularly blood plasma, clamped between a pair of freezing plates. Preferably in the aforementioned use, the first stage refrigerant used in the first refrigeration circuit is a hydrocarbon refrigerant, notably R290 (propane), and the second stage refrigerant used in the second stage refrigeration circuit is also a hydrocarbon refrigerant, notably R170 (ethane).

Aspects disclosed herein in relation to one specific aspect of the invention may be used according to any other aspect to the invention.

An embodiment of the invention will now be described, by way of example only, with reference to the accompanying drawings, of which:

Figure 1:
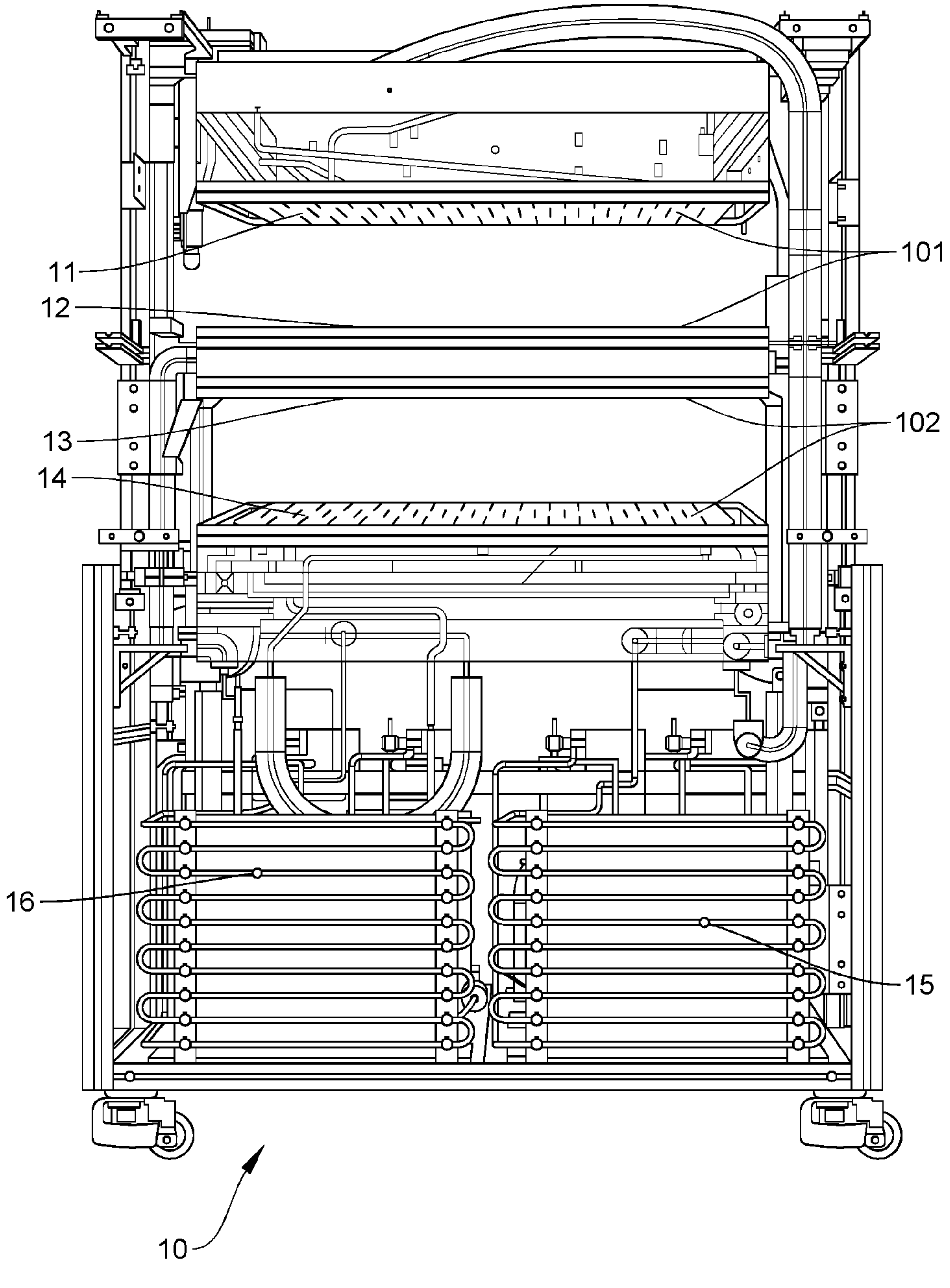
FIG. 1 is a schematic rear view of a medical contact shock freezer.
Figure 2:
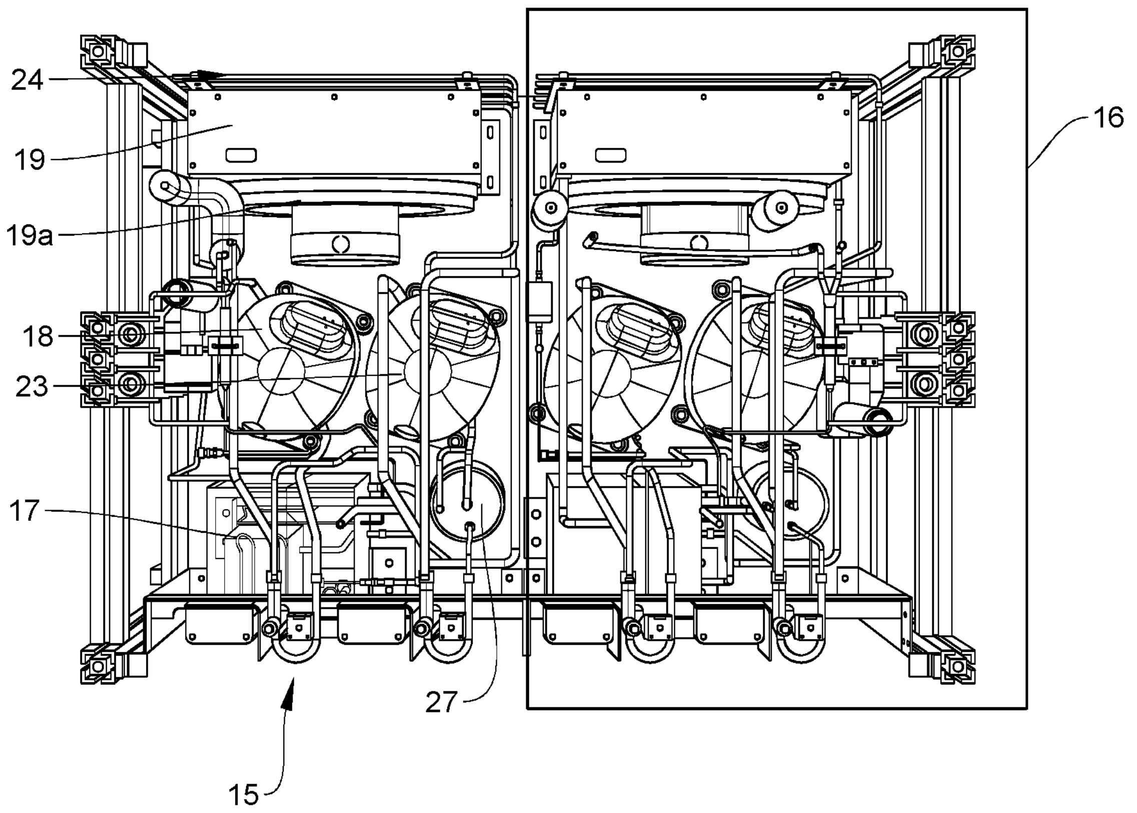
FIG. 2 is a schematic plan view of a cross-section through the medical shock freezer.

The medical contract shock freezer 10 shown in FIGS. 1 and 2 comprises upper 11 and lower 12 freezing plates of a first pair of freezing plates 101 and upper 13 and lower 14 freezing plates of a second pair of freezing plates 102, each pair of freezing plates having the same footprint (for example about 1 m wide by about 0.8 m deep) with the first pair of freezing plates 101 being arranged above the second pair of freezing plate 102 within the same footprint. The lower freezing plate 12 of the first pair of freezing plates and the upper freezing plate 13 of the second pair of freezing plates are provided by a single, immobile, integrated freezing plate. Each of the freezing plates 11, 12, 13, 14 is arranged at an angle of 5° to the horizontal sloping downwards from the rear of the contact shoch freezer to the front.

FIG. 1 shows the freezing plates 11, 12, 13,14 in their loading position in which sufficient separation is provided between the freezing plates of each pair to allow a heat conductive tray carrying individual bags of blood plasma (for example a heat conductive tray carrying fifteen individual bags, each containing 250 ml of blood plasma arranged in five rows in the width direction and three rows in the depth direction of the contact shock freezer) to be loaded between each pair of freezing plates prior to freezing. The loading position is also used during removal of the frozen plasma bags from between each pair of freezing plates subsequent to the freezing operation. In order to clamp the plasma bags between their respective freezing plates for the freezing operation, the moveable freezing plate 11 of the first pair of freezing plates it moved vertically, linearly downwardly by vertically arranged hydraulic cylinders to clamp plasma bags between the first pair of freezing plates and the moveable freezing plate 14 of the first pair of freezing plates is moved vertically, linearly upwards by vertically arranged hydraulic cylinders to clamp plasma bags between the second pair of freezing plate. These movements are reversed to move from the freezing position to the loading position.

A first cascade refrigeration circuit 15, when in a refrigeration mode, removes heat from the first pair of freezing plates 11, 12 to freeze the individual bags of blood plasma clamped between the first pair of freezing plates 101 and a second cascade refrigeration circuit 16, when in a refrigeration mode, removes heat from the second pair of freezing plates 102 to freeze the individual bags of blood plasma clamped between the second pair of freezing plates. The first 15 and second 16 cascade refrigeration circuits are independently operable so that each of the pairs of freezing plates can be operated independently of the other. Each of the refrigeration circuits is connected to its respective moveable freezing plates by flexible stainless-steel hoses of appropriate length. The components, and configuration of each of the individual refrigeration circuits 15,16 are preferably identical; consequently, only one of the refrigeration circuits 15 is described below.

Figure 3:
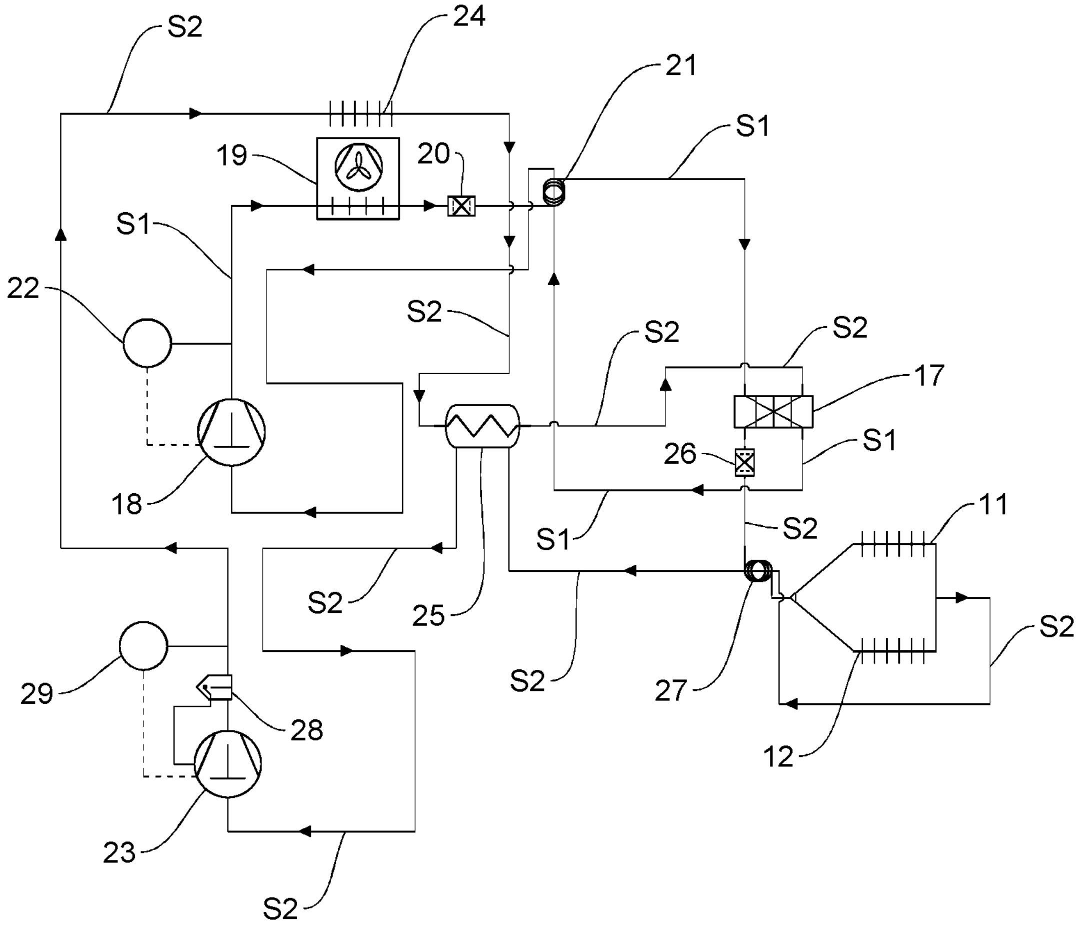
FIG. 3 is a schematic circuit diagram of the first refrigeration circuit.

FIG. 3 illustrates the first refrigeration circuit 15 which comprises a cascade refrigeration circuit comprising a first stage refrigeration circuit S1, a second stage refrigeration circuit S2 and an inter-stage heat exchanger 17. In the configuration described below the first stage refrigerant is 150 g of R290 (propane) and the second refrigerant is 150 g of R170 (ethane). Operation during the refrigeration mode is described in the following paragraphs, the temperatures and pressures indicated being typical, order of magnitude values (given only by way of example) during stable operation during the refrigeration mode.

First Stage Refrigeration Circuit S1

The R290 (propane) first stage refrigerant is sequentially:

- pressurized in a first stage compressor 18 from 2.5 bar/10° C. at the inlet to the first stage compressor 18 to 12 bar/100° C. at the outlet of the first stage compressor 18;
- cooled and condensed in a first stage condenser 19 (preferably a microchannel condenser) from 12 bar/100° C. to 12 bar/30° C.;
- passed through a filter dryer 20;
- expanded in a first stage capillary tube 21 from 12 bar/30° C. to 2.5 bar/−15° C.;
- transferred from the outlet of the first stage capillary tube 21 to an inlet of the inter-stage heat exchanger 17;
- passed through the inter-stage heat exchanger 17 during which it evaporates, thus cooling the second stage refrigerant (R170 (Ethane)) during its passage through the inter-stage heat exchanger 17, the R290 (propane) exiting the inter-stage heat exchanger 17 at 2.5 bar/10° C.; and
- transferred back the inlet of the first stage compressor 18.

In this example, and indeed in general, the first stage refrigerant preferably enters the inter-stage heat exchanger in a mixed liquid and gas phase and exits the inter-stage heat exchanger in a gas phase.

Second Stage Refrigeration Circuit S2

The R170 (ethane) second stage refrigerant is sequentially:

- pressurized in a second stage compressor 23 from 9 bar/−10° C. at the inlet to the second stage compressor 23 to 16.2 bar/110° C. at the outlet of the second stage compressor;
- freely cooled in a second stage desuperheater 24 from 16.2 bar/110° C. to 16.2 bar/60° C.;
- passed through a second stage anti-frost heat exchanger 25 where it is cooled from 16.2 bar/60° C. to 16.2 bar/20° C.;
- passed through the inter-stage heat-exchanger 17 causing it to be cooled and condensed from 16.2 bar/20° C. to 16.2 bar/−15° C. by thermal exchange with the first stage refrigerant (R290 (propane)) in the inter-stage heat-exchanger 17;
- passed through a filter/dryer 26;
- passed through a second stage capillary tube 27 where it is expanded from 16.2 bar/−15° C. to 3.9 bar/−60° C.;
- split in to two streams, one stream being fed through one of the freezing plates 11 of the refrigeration circuit and the other stream being fed through the other freezing plate 12 of the refrigeration circuit, passage of each stream through its respective freezing plate causing evaporation of the R170 (ethane) second stage refrigerant and removing heat from its respective freezing plate to freeze the individual bags of plasma clamped between the freezing plates 11,12. The R170 (ethane) second stage refrigerant increases in temperature from 3.9 bar/−60° C. at the inlet of the freezing plates to 3.9 bar/−40° C. (in a gaseous state) at the outlet of the freezing plates;
- combined into a single stream which is fed through the second stage anti-frost heat exchanger 25 during which its temperature is increased from 3.9 bar/−40° C. to 3.9 bar/−10° C.; and
- transferred back to the inlet of the second stage compressor 23.

The following considerations apply in relation to the specific refrigeration circuits described above, and also more broadly in relation to other refrigeration circuits which are disclosed herein and/or are used in relation to the inventions disclosed herein:

- the first stage condenser preferably has an associated ventilation fan 19*a* which provides an airflow which contributes to dissipating heat from the first stage condenser to the environment. Such a ventilation fan is preferably a variable speed fan controlled by a control circuit of the contact shock freezer, for example based on an indication of the pressure of refrigerant in the first stage refrigeration circuit.
- it is preferred to include a desuperheater in the second stage refrigeration circuit, notably to improve efficiency. Nevertheless, the second stage refrigeration circuit may be designed to operate without a desuperheater. Where a desuperheater is included in the second stage refrigeration circuit, this is preferably arranged so that an airflow which is arranged to cool the condenser of the first stage refrigeration circuit, for example from a ventilation fan, also contributes to dissipating heat to the environment from the second stage desuperheater. This provides a compact and efficient arrangement. For example, a configuration in which ventilating air from a ventilation fan passes through the first stage condenser and subsequently through the second stage desuperheater so as the help dissipate heat from each of these components to the environment is advantageous. This may be achieved by arranging the second stage desuperheater adjacent to the first stage condenser so that ventilating air exiting the first stage condenser passes over the second stage desuperheater prior to being dissipated to the environment.
- a second stage anti-frost heat exchanger is preferably included in the second stage refrigeration circuit and is configured to: i) reduce the temperature of the second stage refrigerant fed from an outlet of the second stage compressor (or from an outlet of the second stage desuperheater when used) to the inlet of the inter-stage heat exchanger—this helps to reduce fatigue of the components of the inter-stage heat exchanger, notably the plates of a multi-plate heat exchanger when used; and ii) increase the temperature of the second stage refrigerant fed from an outlet of the freezing plates to an inlet of the second stage compressor this facilitates operation of the second stage compressor, notably by avoiding an undesirably low operating temperature of the second stage compressor and/or helping to optimise desired viscosity of oil used in the second stage compressor;

the second stage refrigeration circuit preferably comprises an oil separator 28 arranged to separate lubrication oil from the stream of the second stage refrigeration exiting the second stage compressor and return this to the second stage compressor; such lubrication oil is desirable for operation of the second stage compressor but undesirable in the circulating stream of the second stage refrigerant;

a control circuit is preferably arranged to control operation of the second stage refrigeration circuit and preferably comprises a second stage pressure switch 29;

a control circuit is preferably arranged to control operation of the first stage refrigeration circuit and preferably comprises a first stage pressure switch 22.

Figure 4:
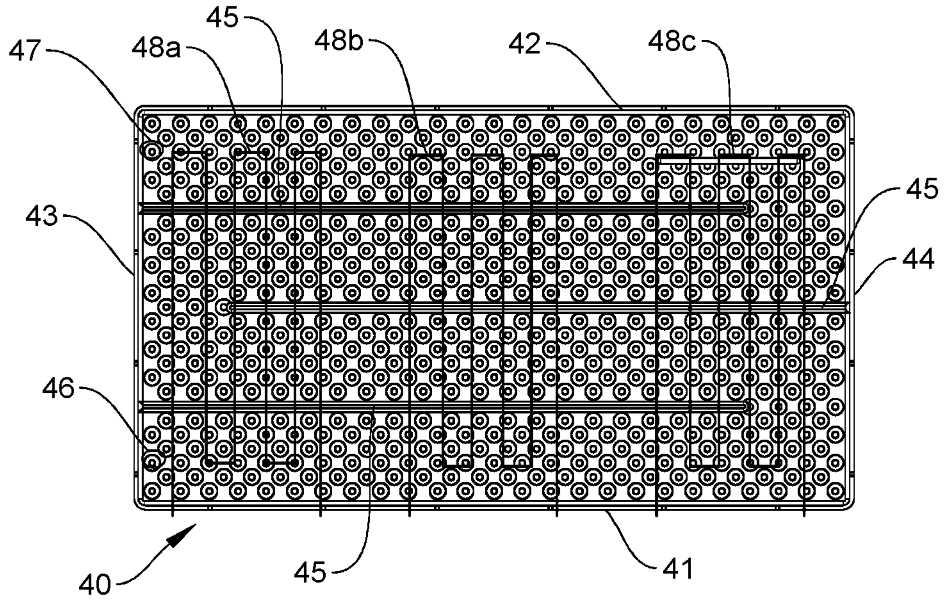
FIG. 4 is a schematic cross-section through a freezing plate.

FIG. 4 is a schematic cross-section through a freezing plate 40 having a front edge 41, rear edge 42, left-hand edge 43 and right-hand edge 44 and which may be used as the upper freezing plate 11 of the first pair of freezing plates described above. A series of refrigerant baffles 45 arranged within the freezing plate 40 define a flow path for the second stage refrigerant (which in the illustrated example is a serpentine flow path) as it passes through the freezing plate between i) a first connecting orifice 46 for the second stage refrigerant which is situated at the front, left-hand corner of the freeing plate 40 and ii) a second connecting orifice 47 for the second stage refrigerant which is situated at the rear, left-hand corner of the freeing plate 40.

The following considerations apply in relation to the specific freezing plate 40 described above, and also more broadly in relation to other freezing plates which are disclosed herein and/or are used in relation to the inventions disclosed herein:

the flow of the second stage refrigerant from an outlet from the inter-stage heat exchanger is preferably split into two streams with one of the streams being fed to an inlet of the first freezing plates of a pair of freezing plates and the other stream being fed to an inlet of the second freezing plate of the pair of freezing plates. This facilitates even freezing of each of the clamped surfaces of the individual bags containing a medical liquid by ensuring that each of the freezing plates of the pair of freezing plates receives a portion of the second stage refrigerant having substantially the same temperature.

each of the freezing plates of the pair preferably comprises a refrigerant flow path for its associated portion of the second stage refrigerant, notably a refrigerant flow path defined within the freezing plate between a refrigerant inlet and a refrigerant outlet. The refrigerant flow path may be defined by one or more refrigerant baffles arranged within the freezing plate. A serpentine refrigerant flow path provides a suitable arrangement. The refrigerant inlet may be arranged at one corner of the freezing plate with the refrigerant outlet arranged at another corner of the freezing plate and the refrigerant flow path defining a passage for the second stage refrigerant between the refrigerant inlet and the refrigerant outlet, notably a passage which causes the second stage refrigerant to contact at least 90% of the surface area of the freezing plate as it passes between the refrigerant inlet and the refrigerant outlet;

each freezing plate of a pair of freezing plates preferably has a corresponding refrigerant flow path, with the refrigerant flow path of the first freezing plates of the pair overlying the refrigerant flow path of the second freezing plate of the pair but with the position of the refrigerant inlets and outlets of the first and second freezing plates reversed so that i) the position of the refrigerant inlet of the first freezing plate corresponds to the position of the refrigerant outlet of the second freezing plate and ii) the position of the refrigerant outlet of the first refrigerant plate corresponding to the position of the refrigerant inlet of the second refrigerant plate. This creates an arrangement in which the flow direction of the second stage refrigerant in the first freezing plate is opposed to the flow direction of the second stage refrigerant in the second freezing plate. This facilitates even freezing of each of the individual bags containing a medical liquid clamped between the pair of freezing plates. For example, in an arrangement similar to that illustrated in FIG. 4, where: i) each freezing plate of the pair has the same configuration and arrangement of refrigerant baffles 45 with 1$^{st}$ connecting orifice 46 at its front left corner and 2$^{nd}$ connecting orifice 47 at its rear left corner; the refrigerant inlet of the first freezing plate is arranged at 1$^{st}$ connecting orifice 46 at its front left corner and the refrigerant outlet is arranged at 2$^{nd}$ connecting orifice at its rear left corner so that the flow direction of the first freezing plate is from the inlet at the front left corner via the refrigerant flow path to the outlet at the rear left corning; and the refrigerant inlet of the second freezing plate is arranged at the 2$^{nd}$ connecting orifice 47 at its rear left corner and the refrigerant outlet is arranged at 1$^{st}$ connecting orifice 46 at its front left corner so that the flow direction of the refrigerant in the second freezing plate is from the inlet at the rear left corner via the refrigerant flow path to the outlet at the front left corner; then there will be an opposed flow direction of the refrigerant in each of the freezing plates. This facilitates even freezing of each of the bags containing a medical liquid which is clamped between the pair of freezing plates.

Each of the freezing plates may be provided with one or more electrical defrost heaters. For example, the freezing plate 40 of FIG. 4 is provided with three electrical resistance defrost heaters 48*a*, 48*b*, 48*c*. When electrical defrost heaters are provided for the freezing plates it is advantageous for the number of electrical defrost heaters to be a multiple of 3; this facilitates equilibrating the electrical load between each phase of a three-phase supply. For example, one convenient configuration is to arrange three defrost heaters at each freezing plate, each of which is powered by a separate phase of a three-phase supply; this helps to equilibrate the load on the three-phase electrical supply by allowing the electrical resistance of the circuit of each of the three electrical phases to be similar or, preferably, the same.

Figure 5:
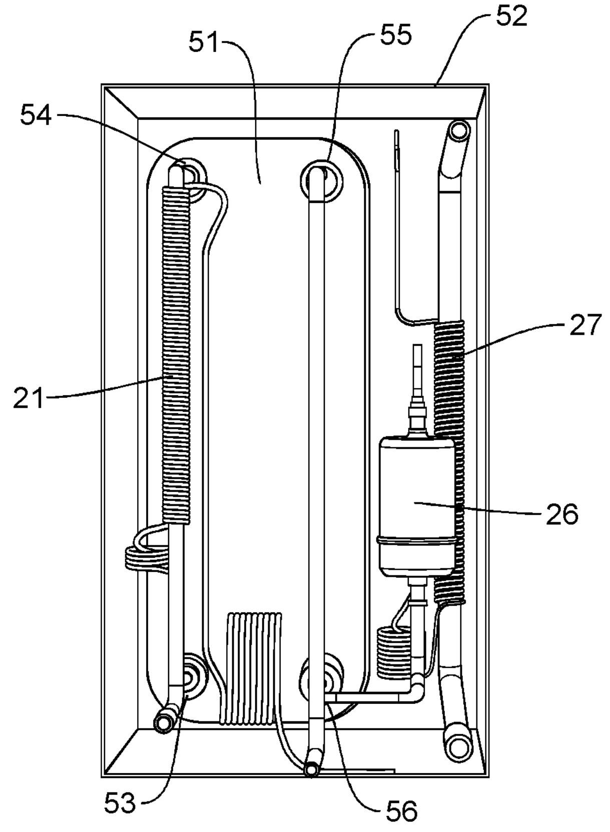
FIG. 5 is a schematic view of an inter-stage heat exchanger.

The inter-stage heat exchanger may be multiplate heat exchanger, preferably a brazed plate multiplate heat exchanger, a preferred arrangement of which is illustrated in FIG. 5. The multiplate heat exchanger 51 is preferably arranged within a heat insulated enclosure 52 containing the first stage capillary tube 21, the second stage filter/dryer 26 and the second stage capillary tube 27; any free space may be filled with insulating foam, for example PUR foam. The outlet of the first stage capillary tube 21 is connected to a first stage inlet 53 of the multiplate heat exchanger 51 with a first stage outlet 54 of the multiplate heat exchanger 51 being connected to return the first stage refrigerant to the first stage compressor 18. A second stage inlet 55 of the inter-stage heat exchanger 17 is fed with second stage refrigerant from an outlet of the second stage compressor 23 (via the second stage desuperheater 24 and anti-frost heat exchanger 25). A second stage outlet 26 of the inter-stage heat exchanger 17 feeds the second stage refrigerant to the second stage capillary tube 27 via the filter/dryer 26.

Figure 6:
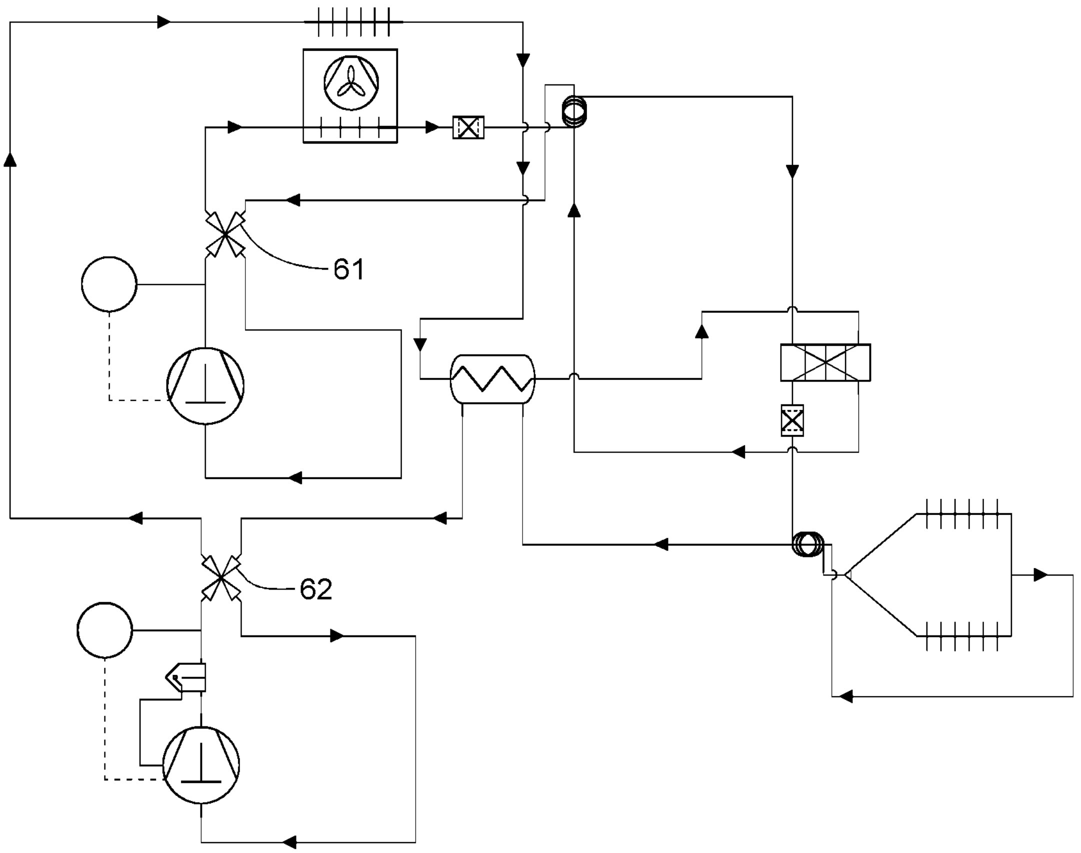
FIG. 6 is a schematic circuit diagram of an alternative first refrigeration circuit.

FIG. 6 illustrates an alternative arrangement in which defrosting of the freezing plates is provided by a first stage circuit reverser 61 and a second stage circuit reverser 62. In this case, electrical defrosting heaters are no longer required. The following considerations apply in relation to the specific refrigeration circuits described above, and also more broadly in relation to other refrigeration circuits which are disclosed herein and/or are used in relation to the inventions disclosed herein:

a) each of the first stage circuit reverser 61 and a second stage circuit reverser 62 may be provided by a four-way valve;

b) the first stage refrigeration circuit comprises a circuit reverser configured, when activated, to cause the first stage refrigeration circuit to switch from its refrigeration mode to a de-frosting mode in which the first stage refrigerant circuit is configured to provide heat to the inter-stage heat exchanger; and the second stage refrigeration circuit comprises a circuit reverser configured, when activated, to cause the second stage refrigeration circuit to switch from its refrigeration mode to a de-frosting mode in which the second stage refrigerant circuit is configured to provide heat to the first pair of freezing plates of the contact shock freezer;

c) the circuit reverser of the first stage refrigeration circuit may comprise a four way valve switchable between i) a refrigeration mode in which an outlet side of the first stage compressor is connected through the valve to the first stage condenser and ii) an inlet side of the first stage compressor is connected through the valve to the inter-stage heat exchanger and ii) a de-frosting mode in which the outlet side of the first stage compressor is connected through the valve to the inter-stage heat exchanger and the inlet side of the first stage compressor is connected through the valve to the first stage condenser; and the circuit reverser of the second stage refrigeration circuit comprises a four way valve switchable between i) a refrigeration mode in which an outlet side of the second stage compressor is connected through the valve to the inter-stage heat exchanger, optionally through the second stage desuperheater, and an inlet side of the second stage compressor is connected through the valve to the first pair of freezing plates and ii) a de-frosting mode in which the outlet side of the second stage compressor is connected through the valve to the first pair of freezing plates and the inlet side of the second stage compressor is connected through the valve to the inter-stage heat exchanger, optionally through the second stage desuperheater.

REFERENCE NUMBERS

10 medical contract shock freezer
11 upper freezing plate of first pair of freezing plates
12 lower freezing plate of a first pair of freezing plates
13 upper freezing plate of a second pair of freezing plates
14 lower freezing plate of a second pair of freezing plates
15 first cascade refrigeration circuit
16 second cascade refrigeration circuit
17 inter-stage heat exchanger
18 first stage compressor
19 first stage condenser
19*a* ventilation fan
20 filter dryer
21 first stage capillary tube
22 first stage pressure switch
23 second stage compressor
24 second stage desuperheater
25 second stage anti-frost heat exchanger
26 filter/dryer
27 second stage capillary tube
28 second stage oil separator
29 second stage pressure switch
40 freezing plate
41 front edge
42 rear edge
43 left-hand edge
44 right-hand edge
45 refrigerant baffles
46 1st connecting orifice
47 2nd connecting orifice
48*a* defrost heater
48*b* defrost heater
48*c* defrost heater
51 multiplate heat exchanger
52 heat insulated enclosure
53 first stage inlet of inter-stage heat exchanger
54 first stage outlet of inter-stage heat exchanger
55 second stage inlet of inter-stage heat exchanger
56 second stage outlet of inter-stage heat exchanger
61 first stage circuit reverser
62 second stage circuit reverser
S1 first stage refrigeration circuit
S2 second stage refrigeration circuit

The invention claimed is:

1. A medical contact shock freezer adapted for fast freezing a plurality of individual bags containing blood plasma, the medical contact shock freezer comprising:

a first pair of freezing plates, at least one of the freezing plates of the first pair of freezing plates being moveable between i) a loading position of the freezing plates in which sufficient separation is provided between the freezing plates to load or unload the individual bags containing blood plasma between the freezing plates and ii) a freezing position in which the individual bags containing blood plasma arranged between the freezing plates are clamped between the freezing plates; and a first refrigeration circuit configured when in a refrigeration mode to remove heat from the first pair of freezing plates to freeze the individual bags containing blood plasma clamped between the first pair of freezing plates;

in which the first refrigeration circuit comprises a cascade refrigeration circuit comprising a first stage refrigeration circuit, a second stage refrigeration circuit and an inter-stage heat exchanger;

the first stage refrigeration circuit being configured when in the refrigeration mode to circulate a first stage refrigerant sequentially through a first stage compressor, a first stage condenser, a first stage capillary, the inter-stage heat exchanger and back to the first stage compressor so as to remove heat from the inter-stage heat exchanger and release heat to the environment via the first stage condenser; and the second stage refrigeration circuit being configured when in the refrigeration mode to circulate a second stage refrigerant sequentially through a second stage compressor, the inter-stage heat exchanger, a second stage capillary, the first pair of freezing plates and back to the second compressor so as to remove heat from the first pair of freezing plates of the contact shock freezer and release heat to the inter-stage heat exchanger;

in which the medical contact shock freezer is configured to simultaneously freeze at least 24 individual bags each containing between 230 ml and 270 ml of blood plasma from a temperature of 32° C. to a temperature of −30° C. in a freezing time of less than 60 minutes, wherein:

the first stage refrigerant is refrigerant grade propane and the first refrigerant circuit comprises between 100 g and 400 g of the first stage refrigerant;

the first stage compressor is a fully hermetic compressor;

the temperature of the first stage refrigerant in the first stage refrigeration circuit has a minimum working temperature in the range −25° C. to −5° C. and a maximum working temperature in the range 90° C. to 110° C.;

the second stage refrigerant is refrigerant grade ethane and the second refrigerant circuit comprises between 100 g and 400 g of the second stage refrigerant;

the second stage compressor is a fully hermetic compressor;

the temperature of the second refrigerant in the second cooling circuit has a minimum working temperature in the range −70° C. to −50° C. and a maximum working temperature in the range 100° C. to 110° C. and the second stage refrigeration circuit is configured such that the second stage refrigerant exiting the second stage capillary is divided into a first circuit portion supplying a first freezing plate of the first pair of freezing plates and a second circuit portion supplying a second freezing plate of the first pair of freezing plates in parallel, the first and second circuit portions being arranged so that the second stage refrigerant flows through the first freezing plate in a direction opposed to the direction of flow through the second freezing plate, whereby each freezing plate of the first pair of freezing plates receives second stage refrigerant at substantially the same inlet temperature.

2. The medical contact shock freezer of claim 1, wherein the medical contact shock freezer is configured to simultaneously freeze at least 24 individual bags each containing between 230 ml and 270 ml of blood plasma from a temperature of 32° C. to a temperature of −30° C. in a freezing time of less than 40 minutes.

3. The medical contact shock freezer of claim 1, wherein the first stage compressor is a fully hermetic compressor having a power rating in the range 1 hp to 3 hp; and the second stage compressor is a fully hermetic compressor having a power rating in the range 1 hp to 3 hp.

4. The medical contact shock freezer of claim 1, wherein the second stage refrigeration circuit comprises an anti-frost heat exchanger configured to transfer heat to the second stage refrigerant upstream of the second stage compressor from another portion of the second stage refrigeration circuit so that the working temperature of the second stage refrigerant at its entry to the second stage compressor is in the range −20° C. to 0° C.

5. The medical contact shock freezer of claim 1, in which the shock freezer further comprises:

a second pair of freezing plates, at least one of the freezing plates of the second pair of freezing plates being moveable between i) a loading position of the freezing plates in which sufficient separation is provided between the freezing plates to load or unload the individual bags between the freezing plates and ii) a freezing position in which the individual bags arranged between the freezing plates are clamped between the freezing plates; and a second refrigeration circuit configured to remove heat from the second pair of freezing plates to freeze the individual bags clamped between the second pair of freezing plates;

in which the second refrigeration circuit comprises a cascade refrigeration circuit comprising a first stage refrigeration circuit, a second stage refrigeration circuit and an inter-stage heat exchanger;

the first stage refrigeration circuit being configured when in the refrigeration mode to circulate a first stage refrigerant, the first stage refrigerant being refrigerant grade propane, sequentially through a first stage compressor, a first stage condenser, a first stage capillary, the inter-stage heat exchanger and back to the first stage compressor so as to remove heat from the inter-stage heat exchanger and release heat to the environment via the first stage condenser; and the second stage refrigeration circuit being configured when in the refrigeration mode to circulate a second stage refrigerant, the second stage refrigerant being refrigerant grade ethane, sequentially through a second stage compressor, the inter-stage heat exchanger, a second stage capillary, the second pair of freezing plates and back to the second compressor so as to remove heat from the second pair of freezing plates of the contact shock freezer and release heat to the inter-stage heat exchanger;

and in which the first refrigeration circuit and the second refrigeration circuit are independently operable.

6. The medical contact shock freezer of claim 1, in which the medical contact shock freezer is configured so that, in the refrigeration mode, each freezing plate is configured to operate at a temperature within the range −65° C. to −55° C.

7. The medical contact shock freezer of claim 1, in which the inter-stage heat exchanger comprises a thermally insulated multiple plate heat exchanger.

8. The medical contact shock freezer of claim 1, in which the second stage refrigeration circuit comprises an anti-frost heat exchanger configured to transfer heat to the second stage refrigerant upstream of the second stage compressor from another portion of the second stage refrigeration circuit.

9. The medical contact shock freezer of claim 1, in which each of the freezing plates is provided with one or more electrical defrost heaters.

10. The medical contact shock freezer of claim 1, in which the first stage refrigeration circuit comprises a circuit reverser configured, when activated, to cause the first stage refrigeration circuit to switch from the refrigeration mode to a de-frosting mode in which the first stage refrigerant circuit is configured to provide heat to the inter-stage heat exchanger; and the second stage refrigeration circuit comprises a circuit reverser configured, when activated, to cause the second stage refrigeration circuit to switch from the refrigeration mode to the de-frosting mode in which the second stage refrigerant circuit is configured to provide heat to the first pair of freezing plates of the contact shock freezer.

11. The medical contact shock freezer of claim 10, in which:

the circuit reverser of the first stage refrigeration circuit comprises a four way valve switchable between i) the refrigeration mode in which an outlet side of the first stage compressor is connected through the valve to the first stage condenser and ii) an inlet side of the first stage compressor is connected through the valve to the inter-stage heat exchanger and ii) the de-frosting mode in which the outlet side of the first stage compressor is connected through the valve to the inter-stage heat exchanger and the inlet side of the first stage compressor is connected through the valve to the first stage condenser; and the circuit reverser of the second stage refrigeration circuit comprises a four way valve switchable between i) the refrigeration mode in which an outlet side of the second stage compressor is connected through the valve to the inter-stage heat exchanger, and an inlet side of the second stage compressor is connected through the valve to the first pair of freezing plates and ii) the de-frosting mode in which the outlet side of the second stage compressor is connected through the valve to the first pair of freezing plates and the inlet side of the second stage compressor is connected through the valve to the inter-stage heat exchanger.

12. The medical contact shock freezer of claim 1, in which each pair of freezing plates is arranged at an angle of between 2° and 10° to horizontal.

13. The medical contact shock freezer of claim 1, in which each pair of freezing plates comprises a fixed freezing plate and a movable freezing plate and in which movement between the loading and freezing position of each pair of freezing plates consists of a linear, vertical displacement of the moveable freezing plates.

14. A method of fast freezing a plurality of individual bags containing blood plasma, the method comprising:

a) providing a medical contact shock freezer in accordance with claim 1;

b) clamping the plurality of individual bags containing the blood plasma between the first pair of freezing plates; and;

c) operating the first refrigeration circuit in the refrigeration mode to remove heat from the first pair of freezing plates to freeze the medical liquid contained in the individual bags arranged between the first pair of freezing plates.

* * * * *